United States Patent
Morobishi et al.

(10) Patent No.: US 10,228,804 B2
(45) Date of Patent: Mar. 12, 2019

(54) MOBILE DEVICE WITH PERIODIC ESTIMATION OF UNDERWATER STATE BASED ON DETECTED ACCELERATION

(71) Applicant: KYOCERA Corporation, Kyoto-shi, Kyoto (JP)

(72) Inventors: Masanori Morobishi, Yokohama (JP); Makoto Honjo, Yokohama (JP); Taro Iio, Yokohama (JP); Manabu Sakuma, Yokohama (JP); Yudai Nagata, Kawasaki (JP); Yuya Yamaguchi, Yokohama (JP); Takayuki Fujiki, Hachioji (JP)

(73) Assignee: KYOCERA CORPORATION, Kyoto (JP)

( * ) Notice: Subject to any disclaimer, the term of this patent is extended or adjusted under 35 U.S.C. 154(b) by 210 days.

(21) Appl. No.: 15/201,646

(22) Filed: Jul. 5, 2016

(65) Prior Publication Data
US 2017/0010691 A1 Jan. 12, 2017

(30) Foreign Application Priority Data

Jul. 9, 2015 (JP) .................. 2015-138169
Jul. 9, 2015 (JP) .................. 2015-138170

(51) Int. Cl.
*G06F 3/041* (2006.01)
*G06F 3/044* (2006.01)
(Continued)

(52) U.S. Cl.
CPC ............ *G06F 3/044* (2013.01); *G06F 1/1694* (2013.01); *G06F 1/3206* (2013.01); *G06F 1/3262* (2013.01); *G06F 3/0416* (2013.01)

(58) Field of Classification Search
CPC . H04B 1/38; G06F 3/041; G06F 3/045; G06F 15/00
See application file for complete search history.

(56) References Cited

U.S. PATENT DOCUMENTS

2008/0165160 A1    7/2008  Kocienda et al.
2011/0238364 A1*   9/2011  Sakai .................. G01C 22/006
                                                          702/141

(Continued)

FOREIGN PATENT DOCUMENTS

JP    2010-118759 A    5/2010
JP    2012-85031 A     4/2012
WO    2008086302 A1    7/2008

OTHER PUBLICATIONS

Office Action in JP Application No. 2015-138169, dated Feb. 21, 2017, for which an explanation of relevance is attached.

Primary Examiner — Pegeman Karimi
(74) Attorney, Agent, or Firm — Hauptman Ham, LLP

(57) ABSTRACT

A mobile device includes an acceleration sensor, a touch screen and a controller. The acceleration sensor is capable of detecting a direction and a magnitude of acceleration acting on the mobile device. The touch screen is capable of measuring electrostatic distribution. The controller is capable of executing an estimation whether the mobile device is being immersed in water based on the electrostatic distribution. The controller periodically executes the estimation upon determining that the mobile device is moving in a direction opposite to a gravity direction based on the direction and the magnitude of the acceleration when estimating that the mobile device is being immersed in water.

17 Claims, 12 Drawing Sheets

(51) Int. Cl.
*G06F 1/16* (2006.01)
*G06F 1/3206* (2019.01)
*G06F 1/3234* (2019.01)

(56) References Cited

U.S. PATENT DOCUMENTS

| | | | | |
|---|---|---|---|---|
| 2015/0141060 A1* | 5/2015 | Shan | ........................ | H04W 4/21 |
| | | | | 455/456.3 |
| 2016/0004283 A1* | 1/2016 | Ganguly | ............... | G06F 1/1656 |
| | | | | 307/118 |
| 2016/0336986 A1* | 11/2016 | Sakuma | ................... | H04B 1/38 |

* cited by examiner

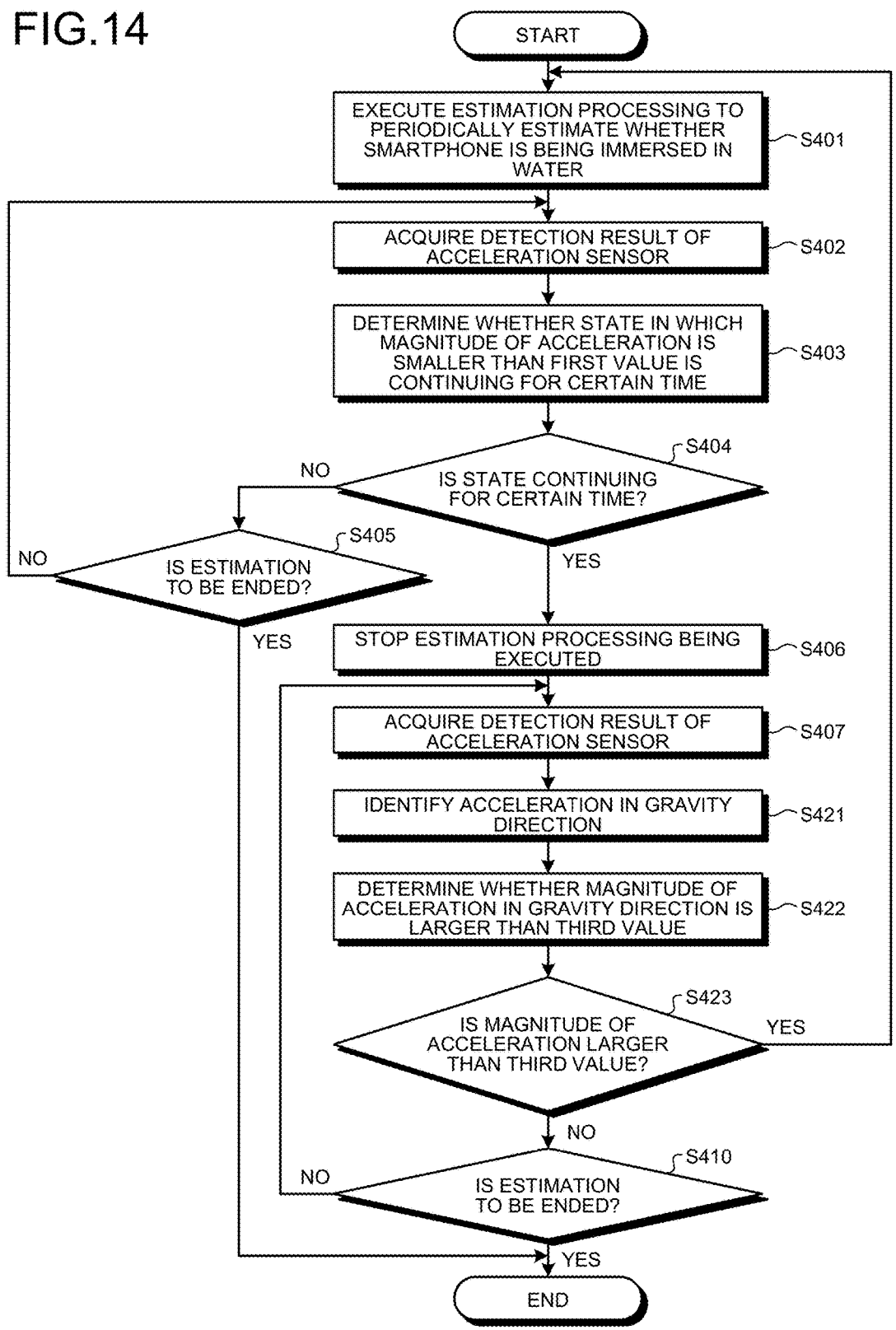

MOBILE DEVICE WITH PERIODIC ESTIMATION OF UNDERWATER STATE BASED ON DETECTED ACCELERATION

CROSS-REFERENCE TO RELATED APPLICATION(S)

The present application claims priority to and incorporates by reference the entire contents of Japanese Patent Application No. 2015-138169 and No. 2015-138170 filed in Japan on Jul. 9, 2015.

BACKGROUND

1. Field

The present application relates to a mobile device.

2. Description of the Related Art

Some mobile devices mount a touch screen. WO 2008/086302 discloses a mobile device that executes various kinds of functions in accordance with operations detected via a touch screen, for example.

SUMMARY

It is an object of embodiments to at least partially solve the problems in the conventional technology.

The above mobile device has room for improvement in techniques using the touch screen.

According to an aspect, a mobile device includes an acceleration sensor configured to be capable of detecting a direction and a magnitude of acceleration acting on the mobile device; a touch screen configured to be capable of measuring electrostatic distribution; and a controller configured to be capable of executing an estimation whether the mobile device is being immersed in water based on the electrostatic distribution. The controller periodically executes the estimation upon determining that the mobile device is moving in a direction opposite to a gravity direction based on the direction and the magnitude of the acceleration when estimating that the mobile device is being immersed in water.

According to an aspect, a mobile device includes an acceleration sensor configured to be capable of detecting a direction and a magnitude of acceleration acting on the mobile device; a touch screen configured to be capable of measuring electrostatic distribution; and a controller configured to be capable of execute an estimation whether the mobile device is being immersed in water based on the electrostatic distribution. The controller periodically executes the estimation upon determining that the mobile device is moving in the gravity direction based on the direction and the magnitude of the acceleration when estimating that the mobile device is not being immersed in water.

According to an aspect, a mobile device includes an acceleration sensor configured to be capable of detecting a direction and magnitude of acceleration acting on the mobile device; a touch screen configured to be capable of measuring electrostatic distribution; and a controller configured to be capable of periodically executing an estimation whether the mobile device is being immersed in water based on the electrostatic distribution. The controller shortens a period of the estimation upon determining that the mobile device is moving in a direction opposite to a gravity direction based on the direction and the magnitude of the acceleration when estimating that the mobile device is being immersed in water.

According to an aspect, a mobile device includes an acceleration sensor configured to be capable of detecting magnitude of acceleration acting on the mobile device; a touch screen configured to be capable of measuring electrostatic distribution; and a controller configured to be capable of periodically executing an estimation whether the mobile device is being immersed in water based on the electrostatic distribution. The controller stops the periodic execution of the estimation when a state in which the magnitude of the acceleration is smaller than a certain value continues for a certain time.

The above and other objects, features, advantages and technical and industrial significance of embodiments will be better understood by reading the following detailed description of presently preferred embodiments, when considered in connection with the accompanying drawings.

BRIEF DESCRIPTION OF THE DRAWINGS

FIG. 14 is a flowchart of a processing procedure of another example of the control by the smartphone.

DETAILED DESCRIPTION OF THE PREFERRED EMBODIMENTS

The following describes a plurality of embodiments for putting a mobile device according to the present application into practice in detail with reference to the accompanying drawings. The following describes a smartphone as an example of the mobile device.

Figure 1:
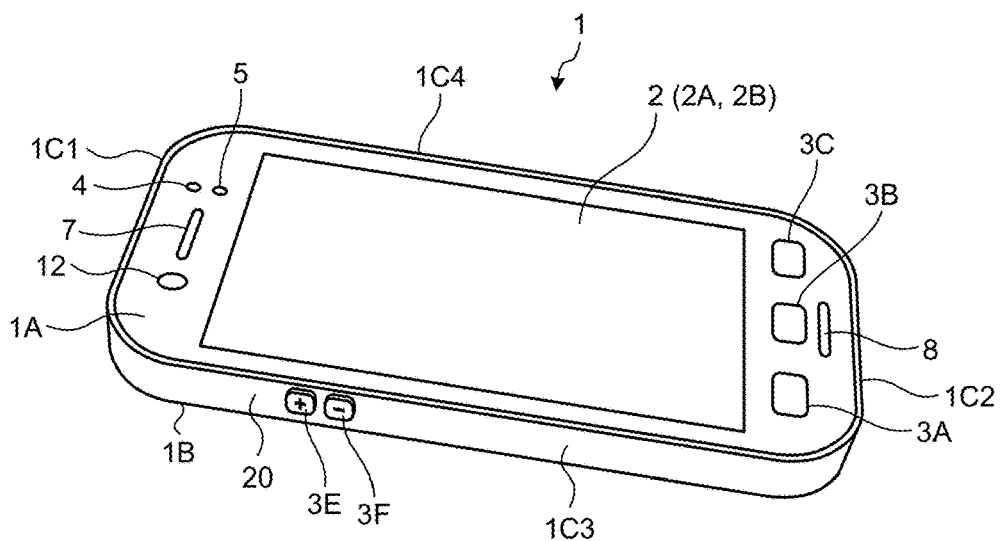
FIG. 1 is a perspective view of a smartphone according to an embodiment.
Figure 2:
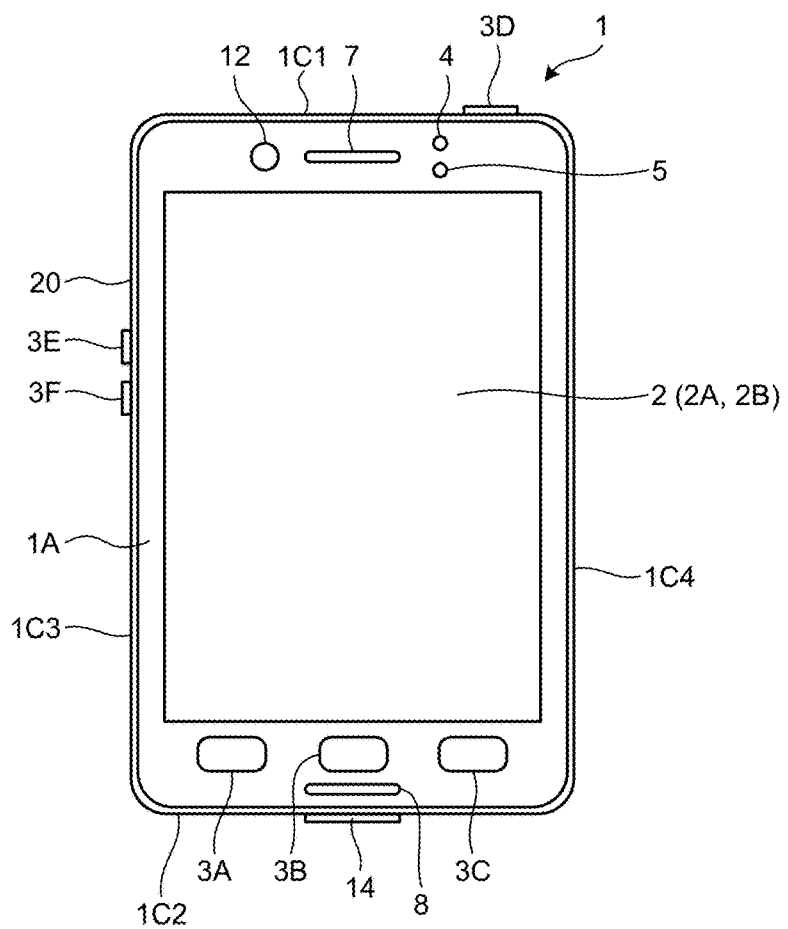
FIG. 2 is a front elevation of the smartphone.
Figure 3:
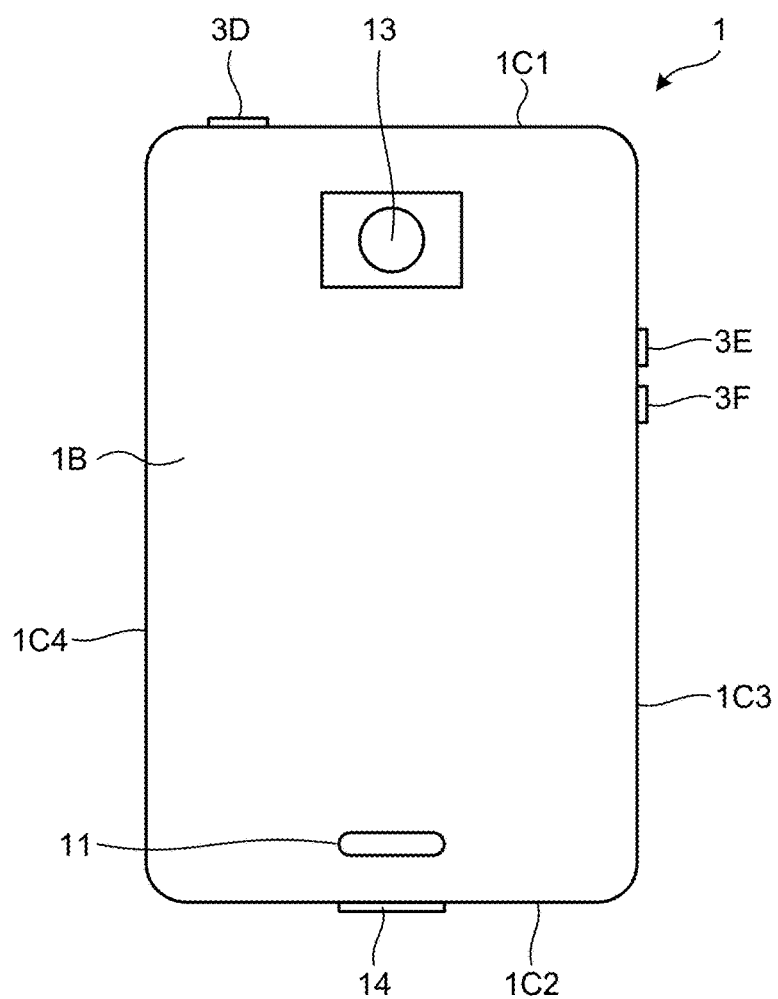
FIG. 3 is a rear elevation of the smartphone.

The following describes an overall configuration of this smartphone 1 according to the embodiment with reference to FIG. 1 through FIG. 3. As illustrated in FIG. 1 through FIG. 3, the smartphone 1 includes a housing 20. The housing 20 includes a front face 1A, a back face 1B, and side faces 1C1 to 1C4. The front face 1A is a front face of the housing 20. The back face 1B is a back face of the housing 20. The side faces 1C1 to 1C4 are side faces that connect the front face 1A and the back face 1B. The following may collectively refer to the side faces 1C1 to 1C4 as a side face 1C without specifying which face.

The smartphone 1 includes a touch screen display 2, buttons 3A to 3C, an illuminance sensor 4, a proximity sensor 5, a receiver 7, a microphone 8, and a camera 12 on the front face 1A. The smartphone 1 includes a speaker 11 and a camera 13 on the back face 1B. The smartphone 1 includes buttons 3D to 3F and a connector 14 on the side face 1C. The following may collectively refer to the buttons 3A to 3F as a button 3 without specifying which button. The following may refer to the smartphone 1 as a "device."

The touch screen display 2 includes a display 2A and a touch screen 2B. Although both the display 2A and the touch screen 2B have a nearly rectangular shape in the example in FIG. 1, the shape of the display 2A and the touch screen 2B is not limited thereto; the display 2A and the touch screen 2B each can have any shape such as a square or a circle. Although the display 2A and the touch screen 2B are positioned to overlap each other in the example in FIG. 1, the positions of the display 2A and the touch screen 2B are not limited thereto; the display 2A and the touch screen 2B may be positioned side by side or positioned separated from each other, for example. Although a long side of the display 2A is along a long side of the touch screen 2B, whereas a short side of the display 2A is along a short side of the touch screen 2B in the example in FIG. 1, the manner of stacking the display 2A and the touch screen 2B is not limited thereto; when the display 2A and the touch screen 2B are positioned to overlap each other, one or a plurality of sides of the display 2A are not necessarily along any side of the touch screen 2B, for example.

The display 2A includes a display device such as a liquid crystal display (LCD), an organic electro-luminescence display (OELD), or an inorganic electro-luminescence display (IELD). The display 2A displays letters, images, symbols, figures, and the like.

The touch screen 2B detects contact or proximity of a finger, a pen, a stylus pen, or the like against the touch screen 2B. When a plurality of fingers, pens, stylus pens, or the like are in contact with or close to the touch screen 2B, the touch screen 2B can detect the positions on the touch screen 2B. The fingers, pens, stylus pens, or the like detected by the touch screen 2B may be referred to as a "finger." The position with which or to which the finger is in contact or close detected by the touch screen 2B may be referred to as a "detection position." The touch screen 2B reports the contact of the finger with the touch screen 2B together with the detection position to a controller 10. The touch screen display 2 including the touch screen 2B can perform operations that can be performed by the touch screen 2B. In other words, the touch screen display 2 may perform the operations performed by the touch screen 2B.

The touch screen 2B can measure information for estimating whether the device is being immersed in water. When employing an electrostatic capacitance system as a detection system, the touch screen 2B can measure electrostatic distribution as information for estimating whether the device is being immersed in water. The electrostatic distribution includes changes in electrostatic capacitance at a plurality of detection points on the touch screen 2B, for example. The touch screen 2B repeatedly applies certain signals to a plurality of respective sensor electrodes arranged across the touch screen 2B in a grid manner and reads output values from the respective sensor electrodes. With this operation, the touch screen 2B can measure the changes in electrostatic capacitance at the detection points on the touch screen 2B as the electrostatic distribution. The sensor electrode is an example of the detection point.

The smartphone 1 determines the type of a gesture based on at least one of contact detected by the touch screen 2B, a position at which contact is detected, a change in a position at which contact is detected, an interval during which contacts are detected, and the number of times contacts are detected. The gesture is an operation performed against the touch screen 2B. Examples of the gesture determined by the smartphone 1 include, but are not limited to, touching, long touching, releasing, swiping, tapping, double tapping, long tapping, dragging, flicking, pinching-in, and pinching-out.

The smartphone 1 performs operations in accordance with these gestures determined via the touch screen 2B. Consequently, operability that is intuitive and easy to use for a user is achieved. The operation that the smartphone 1 performs in accordance with the determined gesture may vary in accordance with a screen displayed on the display 2A. The following description may refer to "detecting contact by the touch screen 2B and determining the type of the gesture to be X by the smartphone 1 based on the detected contact" as a "smartphone detects X" or a "controller detects X" for simplifying the description.

The housing 20 of the smartphone 1 has a structure that prevents water from entering thereinside. The smartphone 1 blocks openings formed in the housing 20 with a functional member that passes gases but does not pass liquids, a cap, or the like in order to achieve a sealed structure. The functional member that passes gases but does not pass liquids is achieved by using Gore-Tex (registered trademark), Drytec, eVent, BERGTECH, or HyventD, for example. In the present embodiment, the housing 20 includes the touch screen display 2 and the button 3. In this case, the smartphone 1 prevents water from entering gaps between the housing 20 and the touch screen display 2 and the button 3 with the functional member that passes gases but does not pass liquids or the like.

The smartphone 1 including the sealed structure can provide various use cases. Examples of the use cases include, but are not limited to, a case used in water places and a case used in water.

Figure 4:
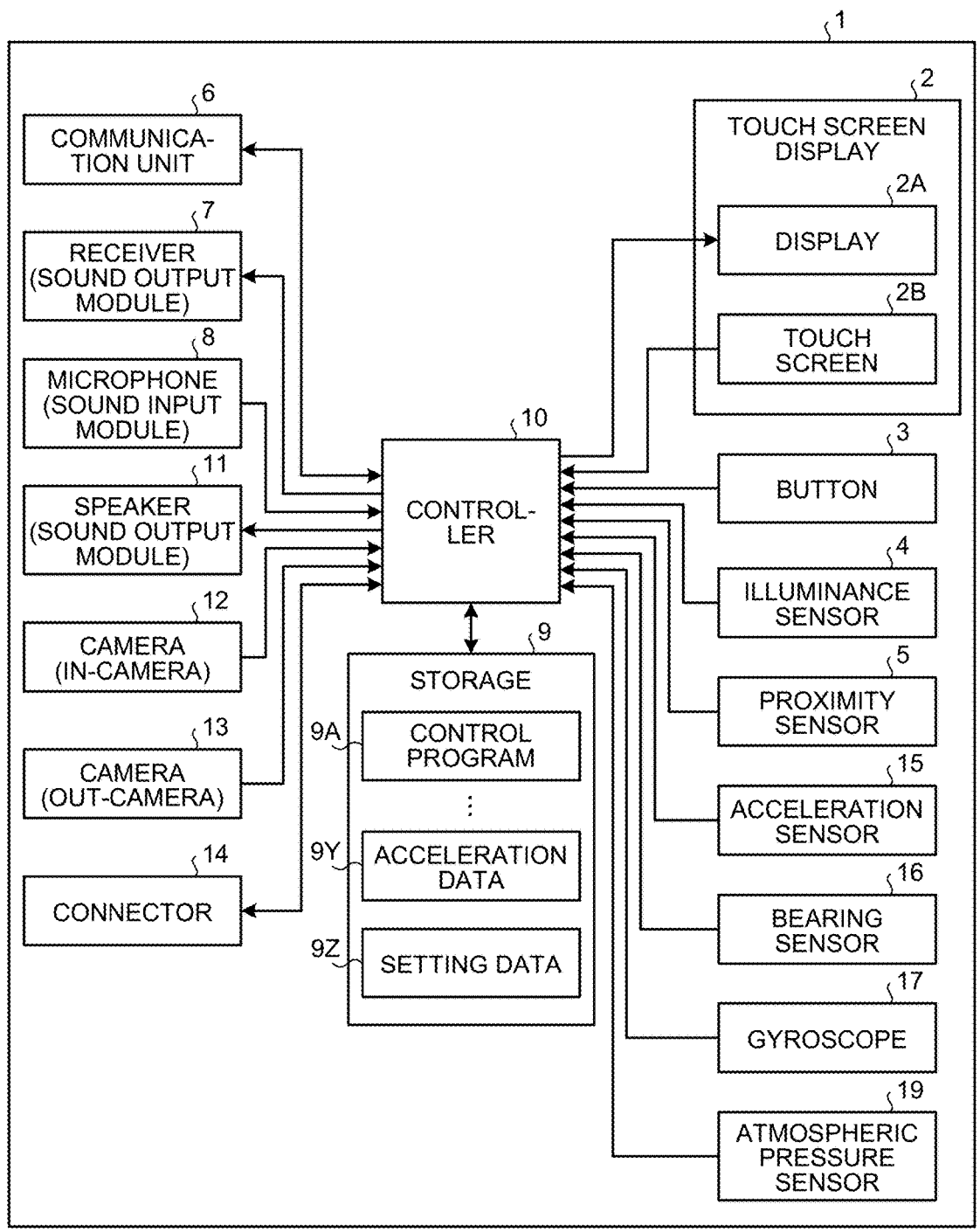
FIG. 4 is a block diagram of the smartphone.

FIG. 4 is a block diagram of the smartphone 1. The smartphone 1 includes the touch screen display 2, the button 3, the illuminance sensor 4, the proximity sensor 5, a communication unit 6, the receiver 7, the microphone 8, a storage 9, a controller 10, the speaker 11, the cameras 12 and 13, the connector 14, an acceleration sensor 15, a bearing sensor 16, a gyroscope 17, and an atmospheric pressure sensor 19.

As described above, the touch screen display 2 includes the display 2A and the touch screen 2B. The display 2A displays letters, images, symbols, figures, and the like. The touch screen 2B detects contact. The controller 10 detects gestures against the smartphone 1. Specifically, the controller 10 detects operations (gestures) against the touch screen 2B (the touch screen display 2) in cooperation with the touch screen 2B.

The button 3 is operated by the user. The button 3 includes the button 3A to the button 3F. The controller 10 detects operations against the button 3 in cooperation with the button 3. Examples of the operations against the button 3 include, but are not limited to, clicking, double clicking, triple clicking, pushing, and multi-pushing.

The buttons 3A to 3C are a home button, a back button, or a menu button, for example. The button 3D is a power-on/off button of the smartphone 1, for example. The button 3D may also serve as a sleep/sleep release button. The buttons 3E and 3F are volume buttons, for example.

The illuminance sensor 4 detects the illuminance of ambient light around the smartphone 1. The illuminance indicates the intensity, brightness, or luminance of light. The illuminance sensor 4 is used for adjusting the luminance of the display 2A, for example. The proximity sensor 5 detects the presence of a nearby object in a noncontact manner. The proximity sensor 5 detects the presence of the object based on a change in a magnetic field, a change in a return time of a reflective wave of an ultrasonic wave to return, or the like. The proximity sensor 5 detects that the touch screen display 2 has approached a face, for example. The illuminance sensor 4 and the proximity sensor 5 may be configured as one sensor. The illuminance sensor 4 may be used as a proximity sensor.

The communication unit 6 performs communication wirelessly. Communication systems supported by the communication unit 6 include wireless communication standards. Examples of the wireless communication standards include, but are not limited to, cellular phone communication standards such as 2G, 3G, and 4G. Examples of the cellular phone communication standards include, but are not limited to, Long Term Evolution (LTE), Wideband Code Division Multiple Access (W-CDMA), Wideband Code Division Multiple Access 2000 (CDMA2000), Personal Digital Cellular (PDC), Global System for Mobile Communications (GSM) (registered trademark), and Personal Handy-phone System (PHS). Other examples of the wireless communication standards include, but are not limited to, Worldwide Interoperability for Microwave Access (WiMAX), IEEE802.11, Bluetooth (registered trademark), Infrared Data Association (IrDA), and Near Field Communication (NFC). The communication unit 6 may support one or a plurality of the communication standards described above.

The receiver 7 and the speaker 11 are examples of a sound output unit that outputs sounds. The receiver 7 and the speaker 11 can output sound signals transmitted from the controller 10 as sounds. The receiver 7 may be used for outputting voices of a person at the other end during a telephone conversation, for example. The speaker 11 may be used for outputting ringtones and music, for example. One of the receiver 7 and the speaker 11 may also function as the other. The microphone 8 is an example of an input unit that inputs sounds. The microphone 8 can convert voices of the user or the like into sound signals and transmit the sound signals to the controller 10.

The storage 9 can store therein computer programs and data. The storage 9 may also be used as a work area that temporarily stores therein processing results of the controller 10. The storage 9 includes a recording medium. The recording medium may include any non-transitory storage medium such as a semiconductor storage medium or a magnetic storage medium. The storage 9 may include a plurality of types of storage media. The storage 9 may include a combination of a portable storage medium such as a memory card, an optical disc, or a magneto-optical disc and a reading apparatus for the storage medium. The storage 9 may include a storage device used as a temporary storage area such as a random access memory (RAM).

The computer program stored in the storage 9 includes an application executed in the foreground or the background and a control program that supports the operation of the application. The application causes the display 2A to display a screen and causes the controller 10 to execute processing responsive to the gesture detected via the touch screen 2B, for example. The control program is an operating system (OS), for example. The application and the control program may be installed in the storage 9 via wireless communication by the communication unit 6 or a non-transitory storage medium.

The storage 9 can store therein a control program 9A, acceleration data 9Y, and setting data 9Z, for example. The acceleration data 9Y includes information relating to acceleration acting on the smartphone 1. The setting data 9Z includes information on various kinds of settings relating to the operation of the smartphone 1.

The control program 9A can provide functions relating to various kinds of control for operating the smartphone 1. The control program 9A controls the communication unit 6, the receiver 7, the microphone 8, and the like and thereby achieves telephone conversation, for example. The functions provided by the control program 9A include a function to perform various kinds of control such as changing information displayed on the display 2A in accordance with the gesture detected via the touch screen 2B. The functions provided by the control program 9A include a function to detect movement, stop, and the like of the user carrying the smartphone 1 by controlling the acceleration sensor 15, the gyroscope 17, the atmospheric pressure sensor 19, and the like. The functions provided by the control program 9A may be used in combination with functions provided by other computer programs such as an atmospheric pressure application.

The control program 9A can provide a function to estimate whether the smartphone 1 (the device) is being immersed in water. A method for estimating that the smartphone 1 is being immersed in water will be described below.

In the acceleration data 9Y, a plurality of pieces of acceleration information transmitted as measurement results of the acceleration sensor 15 are stored, on a time-series basis. The acceleration information includes items of time, and the direction and the magnitude of acceleration. The time indicates a time at which the direction and the magnitude of the acceleration are measured by the acceleration sensor 15. A value of the acceleration indicates a value of the direction and the magnitude of the acceleration measured by the acceleration sensor 15.

A detection result of the acceleration sensor 15 is transmitted to the controller 10, for example. A transmission result includes acceleration in an X-axial direction, acceleration in a Y-axial direction, acceleration in a Z-axial direction, and a vector value obtained by combining the pieces of acceleration. The controller 10 logs the detection result in the acceleration data 9Y of the storage 9. The controller 10 may calculate the acceleration in the X-axial direction, the acceleration in the Y-axial direction, and the acceleration in the Z-axial direction to calculate a resultant vector.

The setting data 9Z includes condition data for estimating that the smartphone 1 (the device) has been immersed in water. That the device is immersed in water includes that the entire device is immersed in water, that the device is submerged, and that part of the device is immersed in water, for example. The condition data will be described below. The setting data 9Z includes periodic data indicating a period with which whether the device is being immersed in water is estimated. The periodic data includes a first period and a second period. The first period is a period longer than the second period.

The controller 10 includes a processor. Examples of the processor include, but are not limited to, a central processing unit (CPU), a system-on-a-chip (SoC), a micro control unit (MCU), a field-programmable gate array (FPGA), and a coprocessor. The controller 10 can integrally control the operation of the smartphone 1. Various kinds of functions of the controller 10 are implemented based on control by the controller 10.

Specifically, the controller 10 can execute instructions included in the computer programs stored in the storage 9. The controller 10 can refer to the data stored in the storage 9 as needed. The controller 10 controls functional units in accordance with the data and the instructions. The controller 10 controls the functional units and thereby implements various kinds of functions. Examples of the functional units include, but are not limited to, the display 2A, the communication unit 6, the receiver 7, and the speaker 11. The controller 10 may change control in accordance with detection results of detection units. Examples of the detection units include, but are not limited to, the touch screen 2B, the button 3, the illuminance sensor 4, the proximity sensor 5, the microphone 8, the camera 12, the camera 13, the acceleration sensor 15, the bearing sensor 16, the gyroscope 17, and the atmospheric pressure sensor 19.

The controller 10 can execute various kinds of control by executing the control program 9A, for example. Examples of the various kinds of control that can be executed by the controller 10 include changing the information displayed on the display 2A in accordance with the gesture detected via the touch screen 2B.

The camera 12 is an in-camera that captures an object facing the front face 1A. The camera 13 is an out-camera that captures an object facing the back face 1B.

The connector 14 is a terminal to which another apparatus is connected. The connector 14 may be a general-purpose terminal such as Universal Serial Bus (USB), High-Definition Multimedia Interface (HDMI) (registered trademark), Light Peak (Thunderbolt (registered trademark)), or an earphone/microphone connector. The connector 14 may be an exclusive terminal such as a Dock connector. Examples of the apparatus connected to the connector 14 include, but are not limited to, an external storage, a speaker, and a communication apparatus.

The acceleration sensor 15 can detect the direction and the magnitude of acceleration acting on the smartphone 1. The acceleration sensor 15 may detect static acceleration by gravity. The bearing sensor 16 can detect the direction of geomagnetism. The gyroscope 17 can detect the magnitude of an angle and an angular velocity of the smartphone 1. The atmospheric pressure sensor 19 can detect atmospheric pressure acting on the smartphone 1. Detection results of the acceleration sensor 15, the bearing sensor 16, the gyroscope 17, and the atmospheric pressure sensor 19 are used in combination to detect changes in the position and attitude of the smartphone 1.

Part or the whole of the computer programs and the data stored by the storage 9 in FIG. 4 may be downloaded from another apparatus via wireless communication by the communication unit 6. Part or the whole of the computer programs and the data stored by the storage 9 in FIG. 4 may be stored in a non-transitory storage medium that can be read by the reading apparatus included in the storage 9. Part or the whole of the computer programs and the data stored by the storage 9 in FIG. 4 may be stored in a non-transitory storage medium that can be read by a reading apparatus connected to the connector 14. Examples of the non-transitory storage medium include, but are not limited to, optical discs such as a compact disc (CD) (registered trademark), a digital versatile disc (DVD) (registered trademark), and Blu-ray (registered trademark), magneto-optical discs, magnetic storage media, memory cards, and solid-state storage media.

The configuration of the smartphone 1 illustrated in FIG. 4 is an example and may appropriately be changed to the extent that the essence of the present invention is not impaired. The number and type of the button 3 are not limited to the example in FIG. 4, for example. The smartphone 1 may provide buttons with numeric key arrangement, QWERTY arrangement, or the like in place of the buttons 3A to 3C as buttons for screen-related operations. The smartphone 1 may provide only one button or does not necessarily provide any button for the screen-related operations. Although the smartphone 1 includes the two cameras in the example illustrated in FIG. 4, the smartphone 1 may provide only one camera or does not necessarily provide any camera. Although the smartphone 1 includes the four kinds of sensors to detect position and attitude in the example illustrated in FIG. 4, the smartphone 1 does not necessarily provide all the sensors. Alternatively, the smartphone 1 may provide a sensor of another type for detecting at least one of position and attitude.

Figure 5:
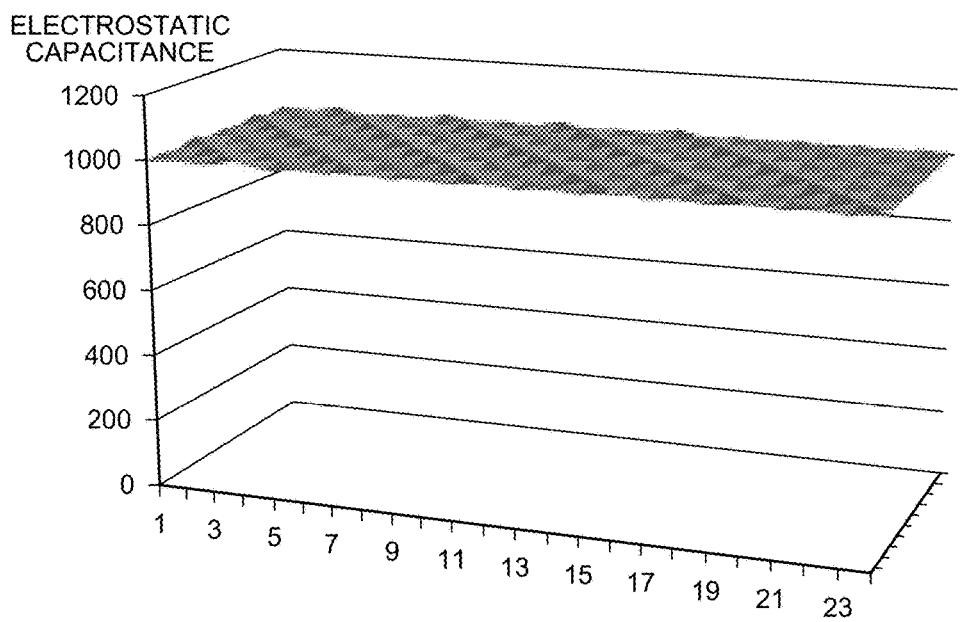
FIG. 5 is a diagram of an example of electrostatic capacitance measured by a touch screen.
Figure 6:
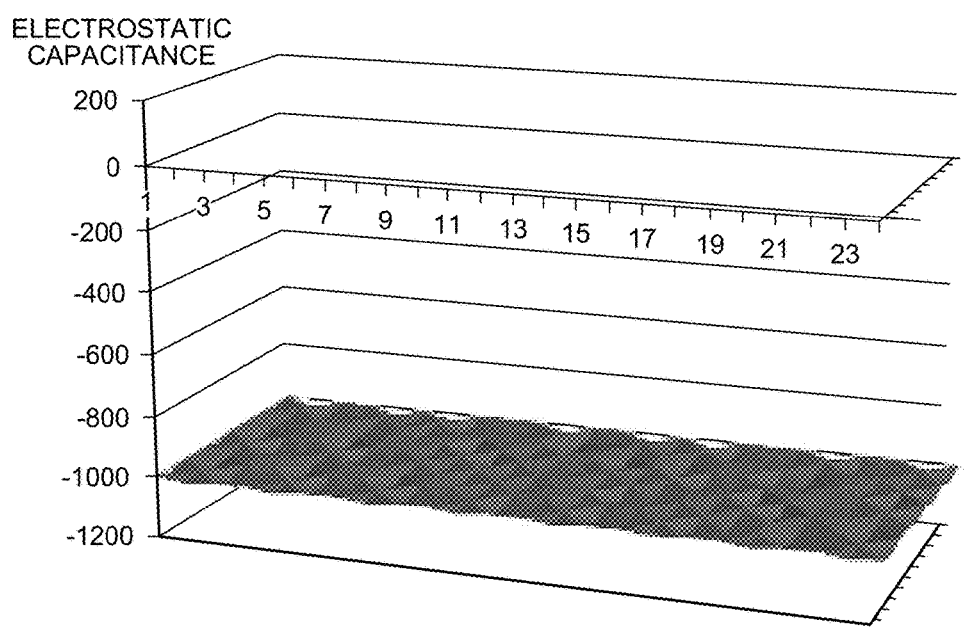
FIG. 6 is a diagram of another example of electrostatic capacitance measured by the touch screen.
Figure 7:
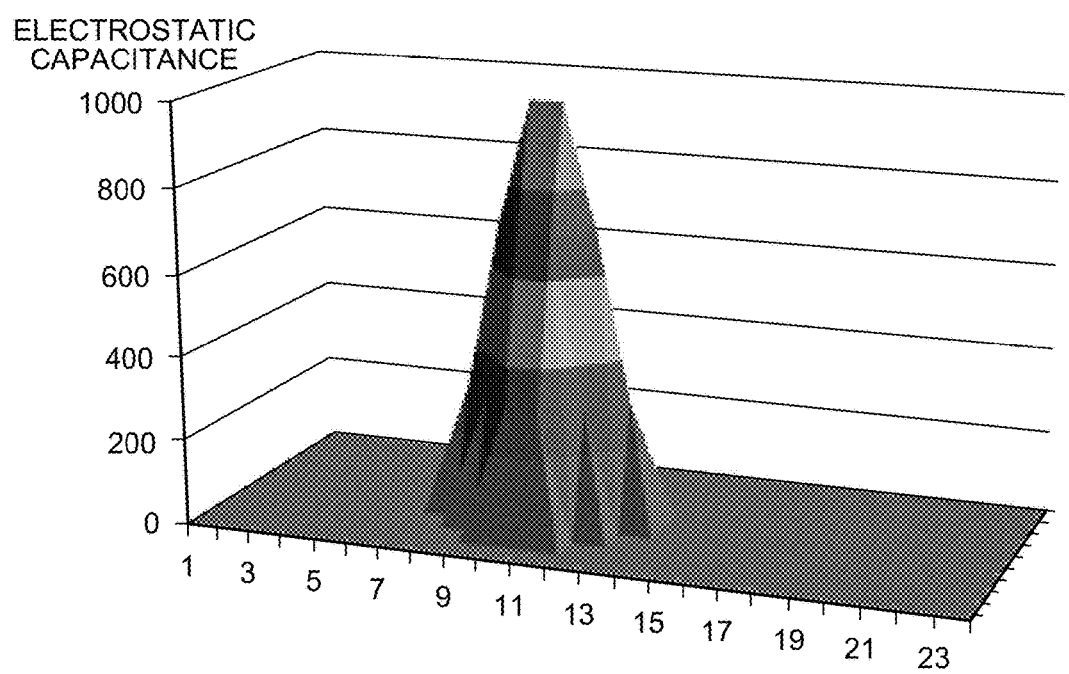
FIG. 7 is a diagram of still another example of electrostatic capacitance measured by the touch screen.

The controller 10 can achieve processing to estimate whether the device is being immersed in water by executing the control program 9A. The controller 10 can estimate that the device is being immersed in water based on a detection result of the touch screen 2B. FIG. 5 is a diagram of an example of electrostatic capacitance measured by the touch screen 2B. FIG. 6 and FIG. 7 are diagrams of other examples of electrostatic capacitance measured by the touch screen 2B. FIG. 5 corresponds to electrostatic capacitance of a case in which the device is being immersed in water. FIG. 6 corresponds to electrostatic capacitance of a case in which the device is not being immersed in water. FIG. 7 corresponds to electrostatic capacitance when a finger is in contact with the touch screen 2B. FIG. 5 through FIG. 7 illustrate electrostatic capacitance on a plane coordinates of the touch screen 2B.

When the smartphone 1 is completely being immersed in water, the touch screen 2B is in contact with water through the entire surface, whereby detection values change at all the detection points. Specifically, the touch screen 2B has larger detection values in water than in the air. Consequently, the smartphone 1 can estimate whether the device is being immersed in water based on electrostatic distribution indicating detection results of the detection points.

When the entire device is being immersed in water, the touch screen 2B can measure the electrostatic distribution illustrated in FIG. 5, for example. The electrostatic distribution illustrated in FIG. 5 indicates electrostatic distribution in which electrostatic capacitance is uniform near a certain positive value. When the device is not being immersed in water, that is, when the device is in the air, the touch screen 2B can measure the electrostatic distribution illustrated in FIG. 6, for example. The electrostatic distribution illustrated in FIG. 6 indicates electrostatic distribution in which electrostatic capacitance is uniform near a certain negative value. When a finger is in contact with the touch screen 2B, the touch screen 2B can measure the nonuniform electrostatic distribution illustrated in FIG. 7, for example. The electrostatic distribution illustrated in FIG. 7 illustrates electrostatic distribution in which the values of electrostatic capacitance are high values only near the contact position of the finger unlike the examples illustrated in FIG. 5 and FIG. 6.

The controller 10 can estimate that the device is being immersed in water when the electrostatic distribution measured by the touch screen 2B has changed to the electrostatic distribution illustrated in FIG. 5. The controller 10 can estimate that the device is not being immersed in water when the electrostatic distribution measured by the touch screen 2B has changed to the electrostatic distribution illustrated in FIG. 6.

The controller 10 can estimate that part of the device has been immersed in water. When part of the smartphone 1 is being immersed in water, the touch screen 2B is in contact with water through part of the surface being immersed in water. The touch screen 2B can measure electrostatic distribution that is higher in the value of electrostatic capacitance in the part being immersed in water and is lower in the value of electrostatic capacitance in the part not being immersed in water. Consequently, the controller 10 may estimate that the device is being immersed in water when part of the device is being immersed in water.

The condition data of the setting data 9Z includes information indicating a first condition. The first condition includes a condition for estimating that the device is being immersed in water. The first condition includes a condition for estimating the electrostatic distribution illustrated in FIG. 5, for example. Examples of the first condition include, but are not limited to, a detection threshold, a detection range, and the range of a detected contact point corresponding to a detection point for use in the estimation.

The condition data includes information indicating a second condition. The second condition includes a condition for estimating that the device has been out of water. The second condition includes a condition for estimating the electrostatic distribution illustrated in FIG. 6, for example. Examples of the second condition include, but are not limited to, a detection threshold, a detection range, and the range of a detected contact point corresponding to a detection point for use in the estimation.

The controller 10 can periodically execute the estimation about whether the device is being immersed in water by executing the control program 9A. The controller 10 can execute the estimation about whether the device is being immersed in water with different periods, for example. The controller 10 can stop the periodic estimation about whether the device is being immersed in water, for example.

The controller 10 can determine the direction of gravity acting on the device based on the direction and the magnitude of static acceleration by executing the control program 9A. The controller 10 analyzes acceleration with 0 hertz (Hz) in the acceleration data 9Y to perform control to determine the direction of gravity acting on the device, for example.

The controller 10 can determine a direction in which the device is moving based on the direction and the magnitude of acceleration by executing the control program 9A. The controller 10 analyzes the acceleration data 9Y to perform control to determine the direction in which the device is moving, for example. When acceleration is a large value in a gravity direction, the controller 10 can determine that the device is moving in the gravity direction, for example. When acceleration is a large value in a direction opposite to the gravity direction, the controller 10 can determine that the device is moving in the direction opposite to the gravity direction, for example.

Acceleration detected by the acceleration sensor 15 may act in an opposite direction to the direction in which the user moves. When the user decelerates while moving in one direction, the acceleration sensor 15 may detect acceleration in a direction opposite to the direction in which the user is moving, for example. When the user is descending stairs and then lands, the acceleration sensor 15 may detect acceleration in the opposite direction, for example. In other words, the detection result of the acceleration sensor 15 can include acceleration and deceleration even when the device is moving in the same direction. The controller 10 compares an acceleration and deceleration pattern indicated by the detection result of the acceleration sensor 15 and an acceleration pattern and determines the direction in which the device is moving based on a comparison result. The acceleration pattern is an acceleration pattern obtained by measuring in advance how acceleration patterns corresponding to the gravity direction and the direction opposite to the gravity direction are characteristically detected by the acceleration sensor 15. When an acceleration pattern of the acceleration data 9Y matches the acceleration pattern in the gravity direction, the controller 10 determines that the device is moving in the gravity direction. The pattern match includes a case in which the acceleration patterns perfectly match and a case in which they match with a certain rate. Consequently, the smartphone 1 can accurately determine the moving direction based on the detection result of the acceleration sensor 15.

When being used in water by the user, the smartphone 1 can estimate the movement of the device from the air to water using the touch screen 2B. When being immersed in water, the smartphone 1 cannot detect any gesture via the touch screen 2B. In this situation, after estimating that the device is being immersed in water, the smartphone 1 can limit the operation of the touch screen 2B. The smartphone 1 in water must drive the touch screen 2B in order to estimate the movement of the device from water to the air using the touch screen 2B. Because driving the touch screen 2B requires power consumption, a driving time is preferably shorter. For this reason, the smartphone 1 must drive the touch screen 2B with appropriate timing to accurately recognize changes from the air to water and from water to the air.

Figure 8:
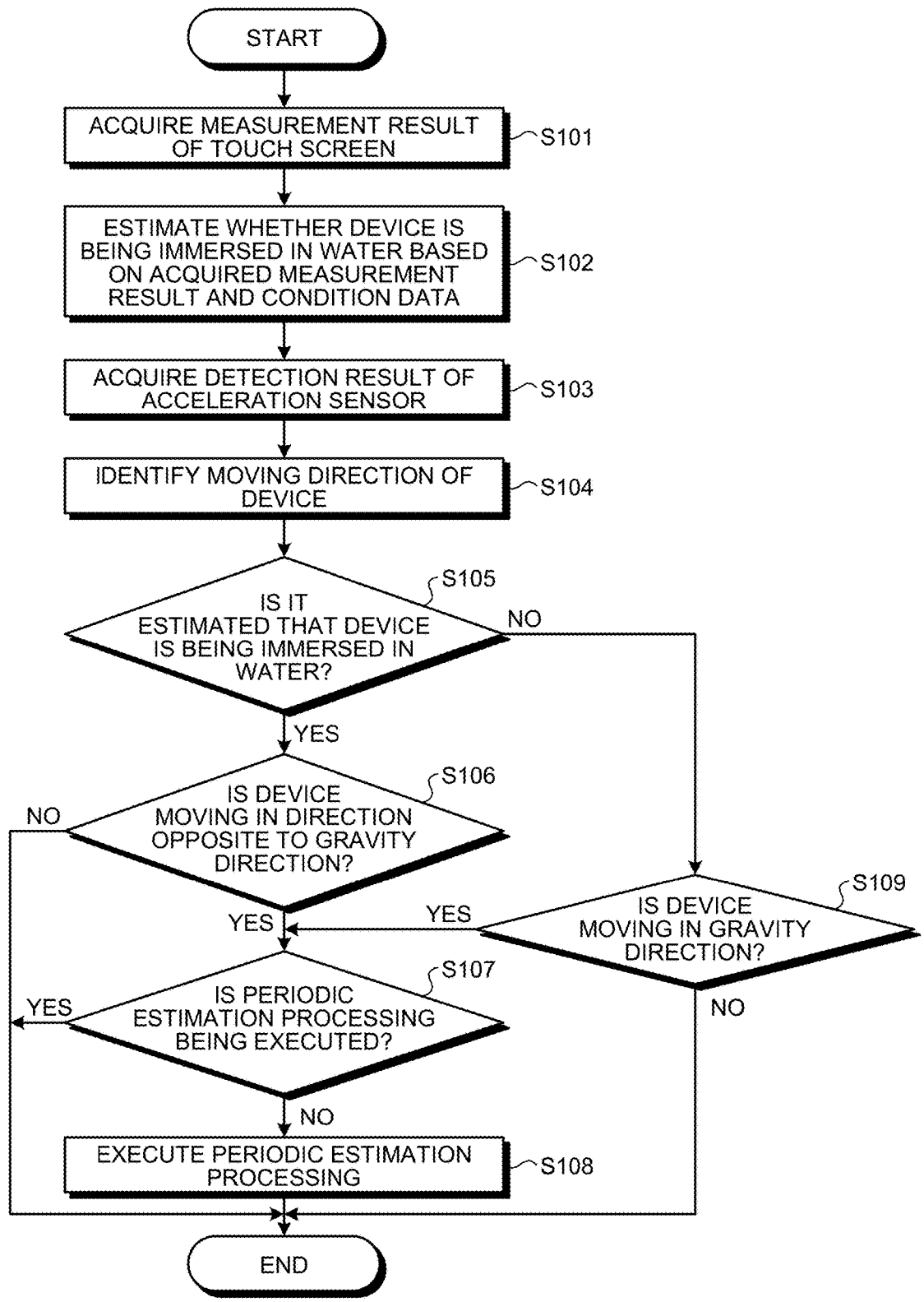
FIG. 8 is a flowchart of a processing procedure of an example of control by the smartphone.

The following describes control about estimation by the smartphone 1 about whether it is being immersed in water with reference to FIG. 8. FIG. 8 is a flowchart of a processing procedure of an example of control by the smartphone 1. The processing procedure illustrated in FIG. 8 is implemented by causing the controller 10 to execute the control program 9A. The processing procedure illustrated in FIG. 8 is repeatedly executed by the controller 10. The processing procedure illustrated in FIG. 8 may be started to be executed in accordance with a certain trigger, for example. Examples of the certain trigger include, but are not limited to, the startup of the device, the start of operation by the user, and the start of movement of the device.

As illustrated in FIG. 8, the controller 10 of the smartphone 1 acquires a measurement result of the touch screen 2B and stores the measurement result in the acceleration data 9Y of the storage 9 at Step S101. Specifically, the controller 10 activates the sensor electrodes of the touch screen 2B and acquires measurement results indicating the output values from the respective sensor electrodes.

The controller 10 estimates whether the device is being immersed in water based on the acquired measurement result and the condition data and stores an estimation result in the storage 9 at Step S102. Specifically, when the electrostatic distribution indicated by the measurement result of the acceleration sensor 15 satisfies the first condition of the condition data, the controller 10 estimates that the device is being immersed in water. When the electrostatic distribution indicated by the measurement result of the acceleration sensor 15 satisfies the second condition of the condition data, the controller 10 estimates that the device is not being immersed in water.

The controller 10 acquires the detection result of the acceleration sensor 15 and stores the detection result in the storage 9 at Step S103. The controller 10 identifies the moving direction of the device and stores the identification result in the storage 9 at Step S104. Specifically, the controller 10 identifies the moving direction of the device based on the direction and the magnitude of acceleration. In a situation in which gravity is acting in a negative direction in the Z-axial direction, when acceleration is larger than a certain value in the negative direction in the Z-axial direction, the controller 10 identifies that the device is moving in the gravity direction, for example. In a situation in which gravity is acting in the negative direction in the Z-axial direction, when acceleration is larger than a certain value in a positive direction in the Z-axial direction, the controller 10 identifies that the device is moving in the direction opposite to the gravity direction, for example.

The controller 10 determines whether it is estimated at Step S102 that the device is being immersed in water at Step S105. When it is determined that it is estimated at Step S102 that the device is being immersed in water (Yes at Step S105), the controller 10 proceeds to Step S106.

The controller 10 determines whether it is identified at Step S104 that the device is moving in the direction opposite to the gravity direction at Step S106. When it is determined that it is identified that the device is moving in the direction opposite to the gravity direction (Yes at Step S106), the controller 10 proceeds to Step S107.

The controller 10 determines whether periodic estimation processing is being executed at Step S107. When it is determined that the periodic estimation processing is not being executed (No at Step S107), the controller 10 proceeds to Step S108. The controller 10 executes the periodic estimation processing at Step S108. The periodic estimation processing will be described below. The controller 10 executes the periodic estimation processing and then ends the processing procedure illustrated in FIG. 8.

When it is determined that the periodic estimation processing is being executed (Yes at Step S107), the controller 10 has no need to execute the periodic estimation processing and ends the processing procedure illustrated in FIG. 8.

When it is determined that it is not identified at Step S104 that the device is moving in the direction opposite to the gravity direction (No at Step S106), the controller 10 ends the processing procedure illustrated in FIG. 8. In other words, when it is estimated that the device is being immersed in water, and when the device is not moving in the direction opposite to the gravity direction, the controller 10 ends the processing procedure illustrated in FIG. 8.

When it is determined that it is not estimated at Step S102 that the device is being immersed in water (No at Step S105), the controller 10 proceeds to Step S109. The controller 10 determines whether it is identified at Step S104 that the device is moving in the gravity direction at Step S109. When it is determined that it is identified at Step S104 that the device is moving in the gravity direction (Yes at Step S109), the controller 10 proceeds to Step S107 already described.

When it is determined that it is not identified that the device is moving in the gravity direction (No at Step S109), the controller 10 ends the processing procedure illustrated in FIG. 8. In other words, when it is estimated that the device is not being immersed in water, and when the device is moving in the direction opposite to the gravity direction, the controller 10 ends the processing procedure illustrated in FIG. 8.

Figure 9:
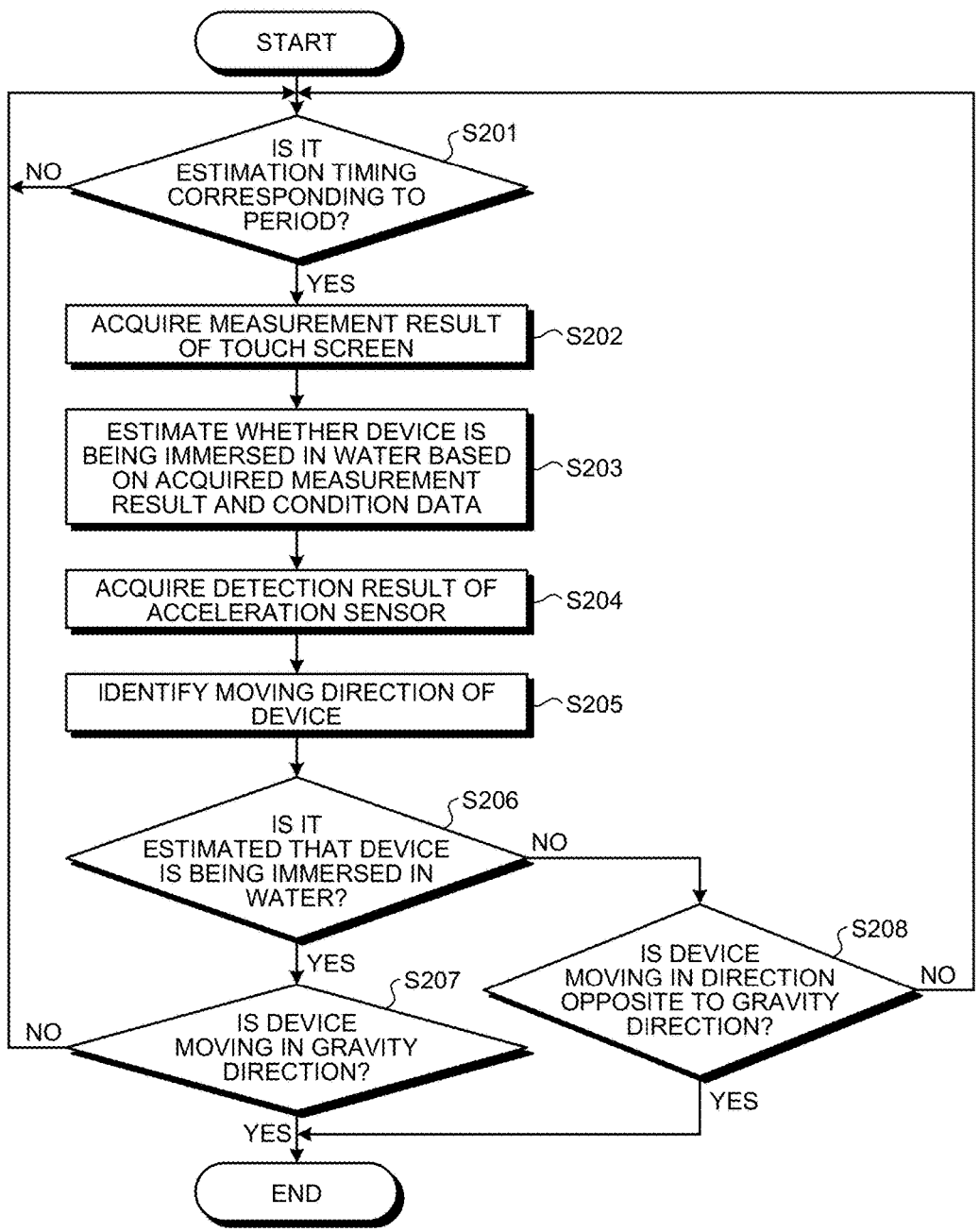
FIG. 9 is a flowchart of an example of periodic estimation processing.

The following describes an example of a processing procedure of the periodic estimation processing with reference to FIG. 9. FIG. 9 is a flowchart of the example of the periodic estimation processing. The processing procedure illustrated in FIG. 9 is started up by causing the controller 10 to execute the processing at Step S108 illustrated in FIG. 8. The processing procedure illustrated in FIG. 9 is executed by the controller 10.

As illustrated in FIG. 9, the controller 10 of the smartphone 1 determines whether it is estimation timing corresponding to a period at Step S201. Specifically, when a certain time has elapsed after performing the previous estimation using the current time, a timer, and the like, the controller 10 determines that it is the estimation timing corresponding to the period. When it is determined that it is not the estimation timing corresponding to the period (No at Step S201), the controller 10 repeats the processing at Step S201. When it is determined that it is the estimation timing corresponding to the period (Yes at Step S201), the controller 10 proceeds to Step S202.

The controller 10 acquires the measurement result of the touch screen 2B and stores the measurement result in the storage 9 at Step S202. The controller 10 estimates whether the device is being immersed in water based on the acquired measurement result and the condition data and stores an estimation result in the storage 9 at Step S203. The pieces of processing at Steps S202 and S203 may be the same as the pieces of processing at Steps S101 and S102 illustrated in FIG. 8.

The controller 10 acquires the detection result of the acceleration sensor 15 and stores the detection result in the storage 9 at Step S204. The controller 10 identifies the moving direction of the device and stores the identification result in the storage 9 at Step S205. The pieces of processing at Steps S204 and S205 may be the same as the pieces of processing at Steps S103 and S104 illustrated in FIG. 8.

The controller 10 determines whether it is estimated at Step S203 that the device is being immersed in water at Step S206. When it is determined that it is estimated at Step S203 that the device is being immersed in water (Yes at Step S206), the controller 10 proceeds to Step S207.

The controller 10 determines whether it is identified at Step S205 that the device is moving in the gravity direction at Step S207. When it is determined that it is not identified that the device is moving in the gravity direction (No at Step S207), the controller 10 returns to Step S201 already described. When it is determined that it is identified that the device is moving in the gravity direction (Yes at Step S207), the controller 10 stops the periodic estimation processing and ends the processing procedure illustrated in FIG. 9.

When it is determined that it is not estimated that the device is being immersed in water (No at Step S206), the controller 10 proceeds to Step S208. The controller 10 determines whether it is identified at Step S205 that the device is moving in the direction opposite to the gravity direction at Step S208. When it is determined that it is not identified that the device is moving in the direction opposite to the gravity direction (No at Step S208), the controller 10 returns to Step S201 already described. When it is determined that it is identified that the device is moving in the direction opposite to the gravity direction (Yes at Step S208), the controller 10 stops the periodic estimation processing and ends the processing procedure illustrated in FIG. 9.

In the processing procedure illustrated in FIG. 8, when it is estimated that the device is being immersed in water, and when the device is moving in the direction opposite to the gravity direction, the controller 10 can execute the periodic estimation processing. When the device in water is moving in the direction opposite to the gravity direction, the smartphone 1 has the possibility of emerging from water into the air, for example. In contrast, when the device in water is moving in the gravity direction, the smartphone 1 has a low possibility of emerging from water into the air. When the device has the possibility of emerging from water into the air, the smartphone 1 can periodically drive the stopped touch screen 2B. Consequently, the smartphone 1 can reduce the power consumption of the touch screen 2B and correctly recognize timing when the device has emerged from water into the air.

When it is estimated that the device is not being immersed in water, and when the device is moving in the gravity direction, the controller 10 can execute the periodic estimation processing. When the device in the air is moving in the gravity direction, the smartphone 1 has the possibility of submerging from the air into water, for example. In contrast, when the device in the air is moving in the direction opposite to the gravity direction, the smartphone 1 has a low possibility of submerging from the air into water. When the device has the possibility of submerging from the air into water, the smartphone 1 can periodically execute estimation about whether the device is being immersed in water based on the electrostatic distribution. Consequently, the smartphone 1 can reduce the power consumption of the touch screen 2B and correctly recognize timing when the device submerges from the air into water.

When it is estimated that the device is not being immersed in water and when periodically executing the estimation processing, the controller 10 can stop the periodic estimation processing in a case that the device is directed to the direction opposite to the gravity direction. Consequently, when the possibility of submerging from the air into water is low, the smartphone 1 can reduce the power consumption of the touch screen 2B.

When it is estimated that the device is being immersed in water and when periodically executing the estimation processing, the controller 10 can stop the periodic estimation processing in a case that the device is directed to the gravity direction. Consequently, when the possibility of emerging from water into the air is low, the smartphone 1 can reduce the power consumption of the touch screen 2B.

Although the processing procedure illustrated in FIG. 8 describes the control of estimation when it is estimated that the device is being immersed in water and when it is estimated that the device is not being immersed in water by the controller 10, embodiments are not limited thereto. The controller 10 may perform the control of estimation either when it is estimated that the device is being immersed in water or when it is estimated that the device is not being immersed in water, for example.

Figure 10:
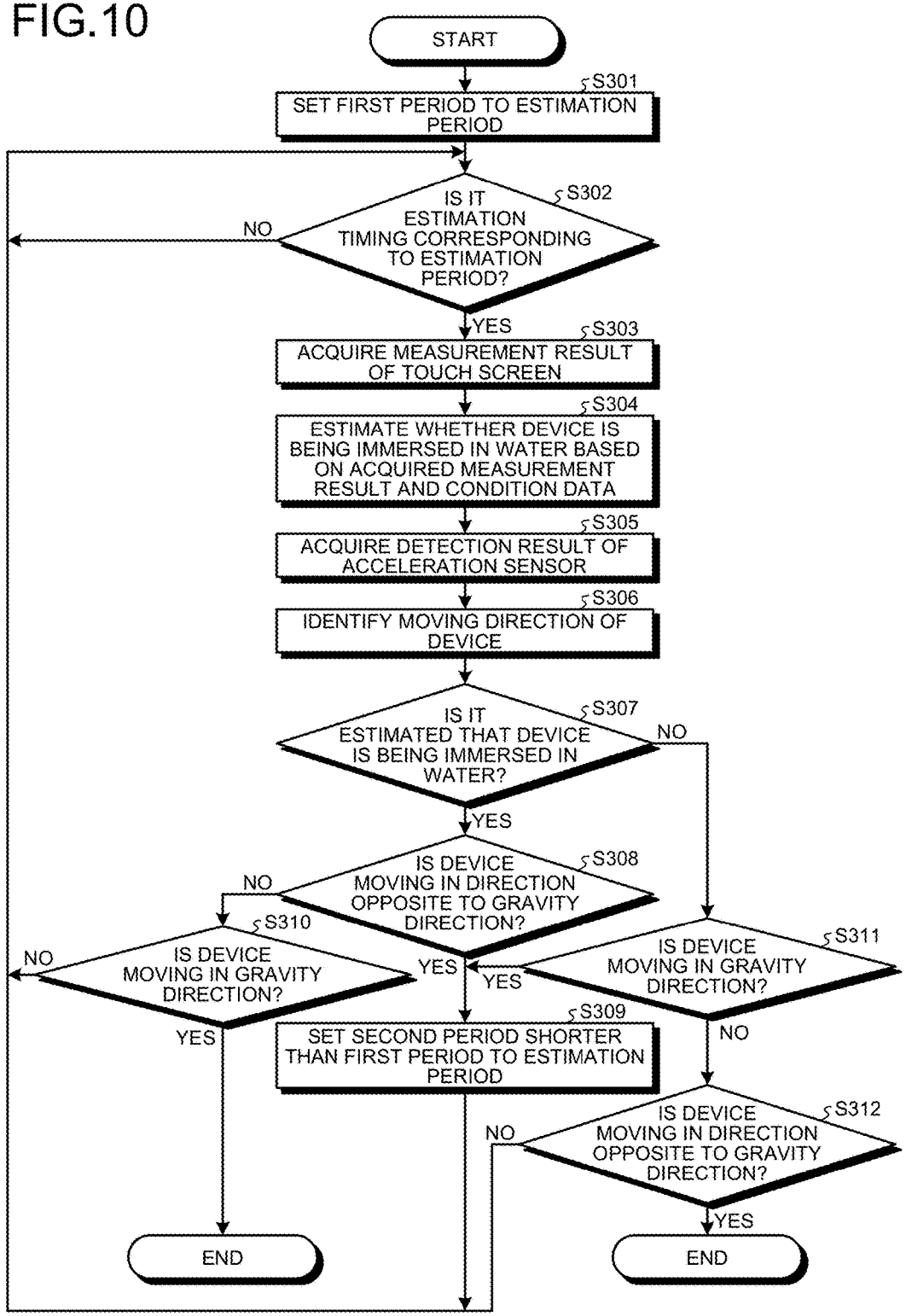
FIG. 10 is a flowchart of a processing procedure of another example of the control by the smartphone.

The following describes control about another example of estimation by the smartphone 1 about whether it is being immersed in water with reference to FIG. 10. FIG. 10 is a flowchart of a processing procedure of another example of the control by the smartphone 1. The processing procedure illustrated in FIG. 10 is implemented by causing the controller 10 to execute the control program 9A. The processing procedure illustrated in FIG. 10 is repeatedly executed by the controller 10. The processing procedure illustrated in FIG. 10 may be started to be executed in accordance with the above certain trigger, for example.

As illustrated in FIG. 10, the controller 10 of the smartphone 1 sets a first period to an estimation period at Step S301. The controller 10 determines whether it is estimation timing corresponding to the estimation period at Step S302. When it is determined that it is not the estimation timing corresponding to the estimation period (No at Step S302), the controller 10 repeats the processing at Step S302. When it is determined that it is the estimation timing corresponding to the estimation period (Yes at Step S302), the controller 10 proceeds to Step S303.

The controller 10 acquires the measurement result of the touch screen 2B and stores the measurement result in the storage 9 at Step S303. The controller 10 estimates whether the device is being immersed in water based on the acquired measurement result and the condition data and stores an estimation result in the storage 9 at Step S304.

The controller 10 acquires the detection result of the acceleration sensor 15 and stores the detection result in the storage 9 at Step S305. The controller 10 identifies the moving direction of the device and stores the identification result in the storage 9 at Step S306.

The controller 10 determines whether it is estimated at Step S304 that the device is being immersed in water at Step S307. When it is determined that it is estimated at Step S304 that the device is being immersed in water (Yes at Step S307), the controller 10 proceeds to Step S308.

The controller 10 determines whether it is identified at Step S306 that the device is moving in the direction opposite to the gravity direction at Step S308. When it is determined that it is identified that the device is moving in the direction opposite to the gravity direction (Yes at Step S308), the controller 10 proceeds to Step S309.

The controller 10 sets a second period shorter than the first period to the estimation period at Step S309. When the processing at Step S309 ends, the controller 10 returns to Step S302 already described.

When it is determined that it is not identified that the device is moving in the direction opposite to the gravity direction (No at Step S308), the controller 10 proceeds to Step S310. The controller 10 determines whether it is identified at Step S307 that the device is moving in the gravity direction at Step S310. When it is determined that it is not identified that the device is moving in the gravity direction (No at Step S310), the controller 10 returns to Step S302 already described. When it is determined that it is identified that the device is moving in the gravity direction (Yes at Step S310), the controller 10 ends the processing procedure illustrated in FIG. 10 in order to stop the periodic execution of estimation.

When it is determined that it is not estimated at Step S304 that the device is being immersed in water (No at Step S307), the controller 10 proceeds to Step S311. The controller 10 determines whether it is identified at Step S306 that the device is moving in the gravity direction at Step S311. When it is determined that it is identified that the device is moving in the gravity direction (Yes at Step S311), the controller 10 proceeds to Step S309 already described.

When it is determined that it is not identified that the device is moving in the gravity direction (No at Step S311), the controller 10 proceeds to Step S312. The controller 10 determines whether it is identified at Step S306 that the device is moving in the direction opposite to the gravity direction at Step S312. When it is determined that it is not identified that the device is moving in the direction opposite to the gravity direction (No at Step S312), the controller 10 returns to Step S302 already described. When it is determined that it is identified that the device is moving in the direction opposite to the gravity direction (Yes at Step S312), the controller 10 ends the processing procedure illustrated in FIG. 10 in order to stop the periodic execution of estimation.

In the processing procedure illustrated in FIG. 10, when it is estimated that the device is being immersed in water, and when the device is moving in the direction opposite to the gravity direction, the controller 10 can shorten the estimation period. Consequently, the smartphone 1 can reduce the power consumption of the touch screen 2B when performing estimation and correctly recognize timing when the device has emerged from water into the air.

When it is estimated that the device is not being immersed in water, and when the device is moving in the gravity direction, the controller 10 can shorten the estimation period. Consequently, the smartphone 1 can reduce the power consumption of the touch screen 2B when performing estimation and correctly recognize timing when the device submerges from the air into water.

When it is estimated that the device is not being immersed in water and when periodically executing estimation, the controller 10 can stop the periodic execution of estimation in the case that the device is directed to the direction opposite to the gravity direction. Consequently, when the possibility of submerging from the air into water is low, the smartphone 1 can reduce the power consumption of the touch screen 2B.

When it is estimated that the device is being immersed in water and when periodically executing estimation, the controller 10 can stop the periodic execution of estimation in the case that the device is directed to the gravity direction. Consequently, when the possibility of emerging from water into the air is low, the smartphone 1 can reduce the power consumption of the touch screen 2B.

Figure 11:
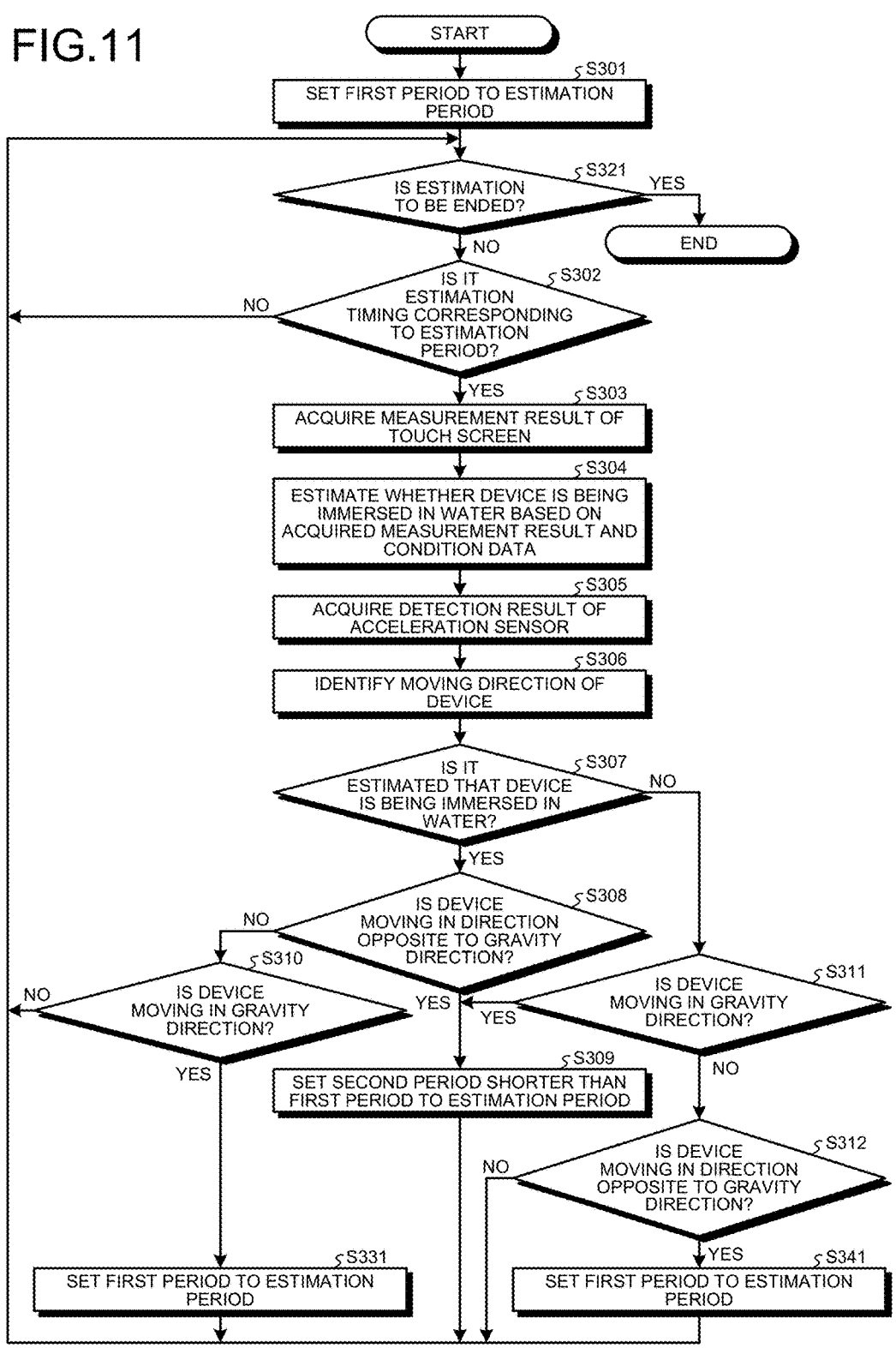
FIG. 11 is a flowchart of a processing procedure of still another example of the control by the smartphone.

The following describes control about still another example of estimation by the smartphone 1 about whether it is being immersed in water with reference to FIG. 11. FIG. 11 is a flowchart of a processing procedure of still another example of the control by the smartphone 1. The processing procedure illustrated in FIG. 11 is implemented by causing the controller 10 to execute the control program 9A. The processing procedure illustrated in FIG. 11 is repeatedly executed by the controller 10. The processing procedure illustrated in FIG. 11 may be started to be executed in accordance with the above certain trigger, for example. The following description may attach the same symbols to similar components and omit duplicate descriptions.

As illustrated in FIG. 11, the controller 10 of the smartphone 1 sets the first period to the estimation period at Step S301. The controller 10 determines whether estimation is to be ended at Step S321. The controller 10 determines that estimation is to be ended when the ending of the device is requested, for example. When it is determined that estimation is to be ended (Yes at Step S321), the controller 10 ends the processing procedure illustrated in FIG. 11. When it is determined that estimation is not to be ended (No at Step S321), the controller 10 proceeds to Step S302.

In the example illustrated in FIG. 11, pieces of processing at Step S302 to Step S309 and Step S311 are the same as the pieces of processing at Step S302 to Step S309 and Step S311 illustrated in FIG. 10, and only different part will be described with a description of the same part omitted.

When the processing at Step S309 ends, the controller 10 returns to Step S321 already described.

The controller 10 determines whether it is identified at Step S306 that the device is moving in the gravity direction at Step S310. When it is determined that it is not identified that the device is moving in the gravity direction (No at Step S310), the controller 10 returns to Step S321 already described. When it is determined that it is identified that the device is moving in the gravity direction (Yes at Step S310), the controller 10 proceeds to Step S331.

The controller 10 sets the first period to the estimation period at Step S331. When the processing at Step S331 ends, the controller 10 returns to Step S321 already described.

The controller 10 determines whether it is identified at Step S306 that the device is moving in the direction opposite to the gravity direction at Step S312. When it is determined that it is not identified that the device is moving in the direction opposite to the gravity direction (No at Step S312), the controller 10 returns to Step S321 already described. When it is determined that it is identified that the device is moving in the direction opposite to the gravity direction (Yes at Step S312), the controller 10 proceeds to Step S341.

The controller 10 sets the first period to the estimation period at Step S341. When the processing at Step S341 ends, the controller 10 returns to Step S321 already described.

In the processing procedure illustrated in FIG. 11, the controller 10 can change the estimation period based on the estimation result about whether the device is being immersed in water and a moving state of the device. Consequently, when performing estimation in water using the touch screen 2B, the smartphone 1 can decide a period for estimating that the device is being in water from the state of the device. The smartphone 1 can reduce the power consumption of the touch screen 2B when performing estimation and correctly recognize timing when the device has emerged from water into the air.

Although the processing procedure illustrated in FIG. 11 describes a case in which the controller 10 ends the processing procedure when the ending of the device is requested, embodiments are not limited thereto. When the ending of the device is requested, and when estimation is performed with the second estimation, the controller 10 may change the estimation period to the first period to continue estimation with the first period, for example.

The smartphone 1 can set the display 2A into a non-display state when a certain time has elapsed after the last operation by the user, for example. The non-display state includes a state in which the light of the display 2A is turned off, for example. When performing estimation with the second period, when the display 2A is changed to the non-display state, the controller 10 may change the estimation period to the first period to continue estimation with the first period.

Embodiments disclosed by the present application can be changed without departing from the essence and scope of the invention. Furthermore, embodiments disclosed by the present application and their modifications can appropriately be combined with each other. Embodiments may be modified as follows, for example.

The computer programs illustrated in FIG. 4 may be divided into a plurality of modules or may be combined with other computer programs, for example.

Although embodiments describe a case in which the smartphone 1 changes the estimation period when there are both possibilities of the device moving from water to the air and from the air to water, embodiments are not limited thereto. The smartphone 1 may change the estimation period when the device can move from water to the air or from the air to water, for example.

In the embodiments described above, the smartphone 1 can detect the speed (movement amount) of the device in the gravity direction based on the direction and the magnitude of acceleration. The smartphone 1 may dynamically change the estimation period to a period corresponding to the speed (the movement amount of the device) based on the detected speed of the device. The smartphone 1 may shorten the estimation period as the speed of the device in the gravity direction increases, for example. The smartphone 1 may elongate the estimation period as the speed in the gravity direction decreases, for example.

The controller 10 can change the processing at Step S309 illustrated in FIG. 10 to processing to specify the speed of the device and to set a period corresponding to the speed to the estimation period, for example. The controller 10 can specify the period corresponding to the speed using a table indicating relation between the speed and the period, a calculation program, or the like.

When the smartphone 1 is dropped and immersed in water, the smartphone 1 can sink under water, for example. In the embodiments described above, when estimating to be in water, the smartphone 1 may calculate the movement amount in the gravity direction and elongate the estimation period as the smartphone 1 departs from a position at which it has entered the water. The smartphone 1 may stop the periodic execution of estimation at a certain position from the position at which it has entered the water, for example.

The controller 10 can change the processing at Step S309 illustrated in FIG. 10 to processing to measure the depth of water based on water pressure by the atmospheric pressure sensor 19 and to set a period corresponding to the measured depth of water to the estimation period, for example. The controller 10 can decide the period corresponding to the depth of water using a table indicating relation between the depth of water and the period, a calculation program, or the like.

Figure 12:
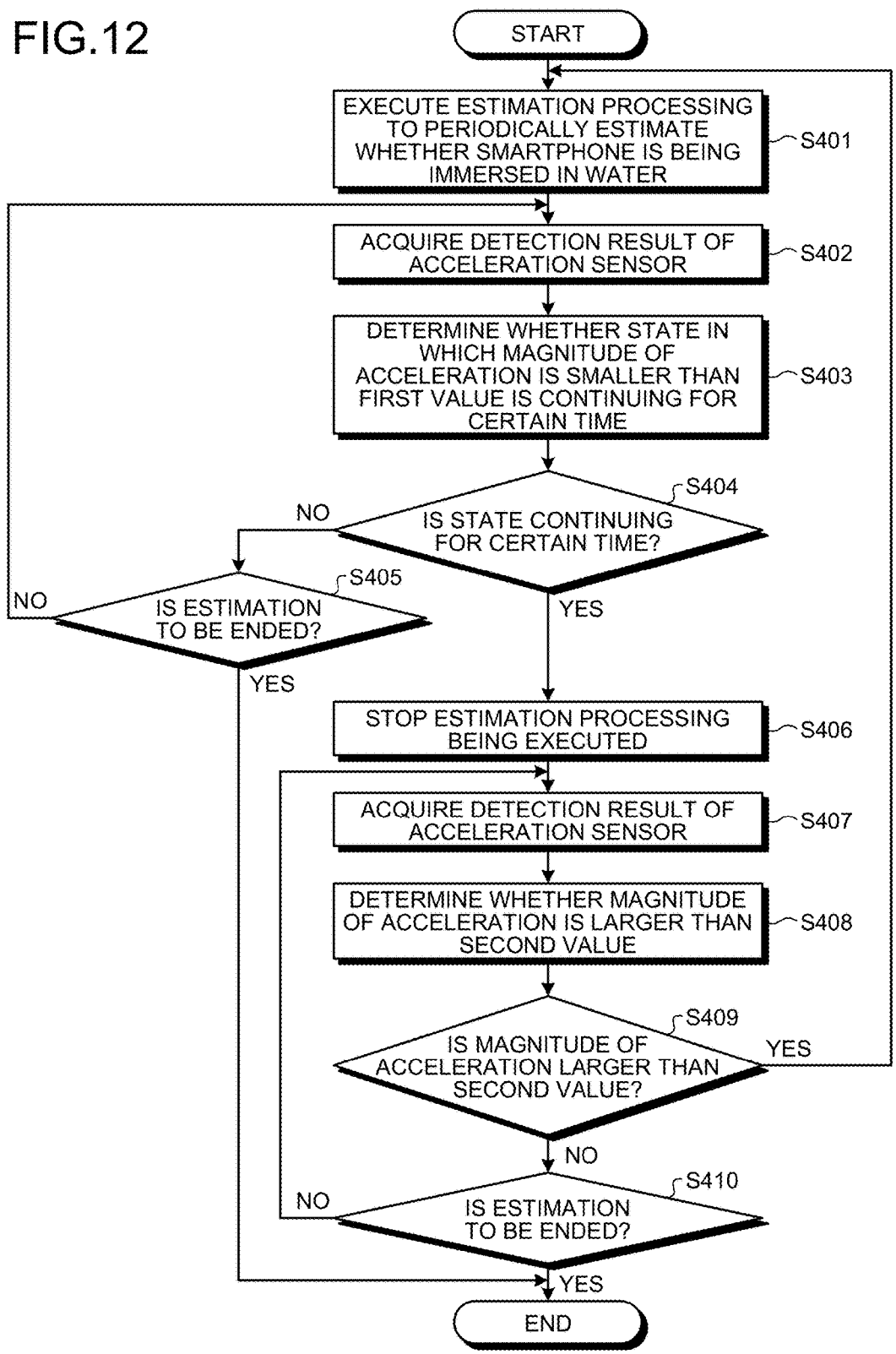
FIG. 12 is a flowchart of a processing procedure of an example of the control by the smartphone.

The following describes control about estimation by the smartphone 1 about whether it is being immersed in water with reference to FIG. 12. FIG. 12 is a flowchart of a processing procedure of an example of the control by the smartphone 1. The processing procedure illustrated in FIG. 12 is implemented by causing the controller 10 to execute the control program 9A. The processing procedure illustrated in FIG. 12 is repeatedly executed by the controller 10. The processing procedure illustrated in FIG. 12 may be started to be executed in accordance with a certain trigger, for example. Examples of the certain trigger include, but are not limited to, the startup of the device, the start of operation by the user, and the start of movement of the device.

As illustrated in FIG. 12, the controller 10 of the smartphone 1 executes estimation processing to periodically estimate whether the smartphone 1 is being immersed in water at Step S401. The estimation processing will be described later. The controller 10, while executing the estimation processing, acquires the detection result of the acceleration sensor 15 and stores the detection result in the acceleration data 9Y of the storage 9 at Step S402.

The controller 10 determines whether a state in which the magnitude of acceleration is smaller than a first value is continuing for a certain time at Step S403. The first value includes a threshold set for determining a stationary state of the device, for example. The stationary state includes a state in which the device is left in a stationary state, for example. The stationary state includes a state in which the user carrying the device is stationary, for example. The stationary state includes a state in which the device is not moving in water, for example. The controller 10 specifies a continuation time of the state in which the magnitude of acceleration is smaller than the first value based on the acceleration data 9Y, for example. When the specified continuation time is longer than the certain time, the controller 10 determines that the state in which the magnitude of acceleration is smaller than the first value is continuing for the certain time.

When the determination result at Step S403 is not continuing for the certain time (No at Step S404), the controller 10 proceeds to Step S405. The controller 10 determines whether estimation is to be ended at Step S405. The controller 10 determines that estimation is to be ended when the ending of the device is requested, for example. When it is determined that estimation is to be ended (Yes at Step S405), the controller 10 ends the processing procedure illustrated in FIG. 12. When it is determined that estimation is not to be ended (No at Step S405), the controller 10 returns to Step S402 already described.

When the determination result at Step S403 is continuing for the certain time (Yes at Step S404), the controller 10 proceeds to Step S406. The controller 10 stops the estimation processing being executed at Step S406. When stopping the estimation processing, the controller 10 acquires the detection result of the acceleration sensor 15 and stores the detection result in the acceleration data 9Y of the storage 9 at Step S407.

The controller 10 determines whether the magnitude of acceleration is larger than a second value at Step S408. The second value includes a threshold set for determining that acceleration has acted in the stationary state of the device, for example. The second value includes a threshold set for determining that the device has started to move in the stationary state, for example. The second value may be the same as the first value. When it is determined that the magnitude of acceleration is larger than the second value (Yes at Step S409), the controller 10 returns to Step S401 already described. Consequently, the controller 10 can execute the estimation processing again which had been stopped.

When it is determined that the magnitude of acceleration is not larger than the second value (No at Step S409), the controller 10 proceeds to Step S410. The controller 10 determines whether estimation is to be ended at Step S410. When it is determined that estimation is not to be ended (No at Step S410), the controller 10 returns to Step S407 already described. When it is determined that estimation is to be ended (Yes at Step S410), the controller 10 ends the processing procedure illustrated in FIG. 12.

Figure 13:
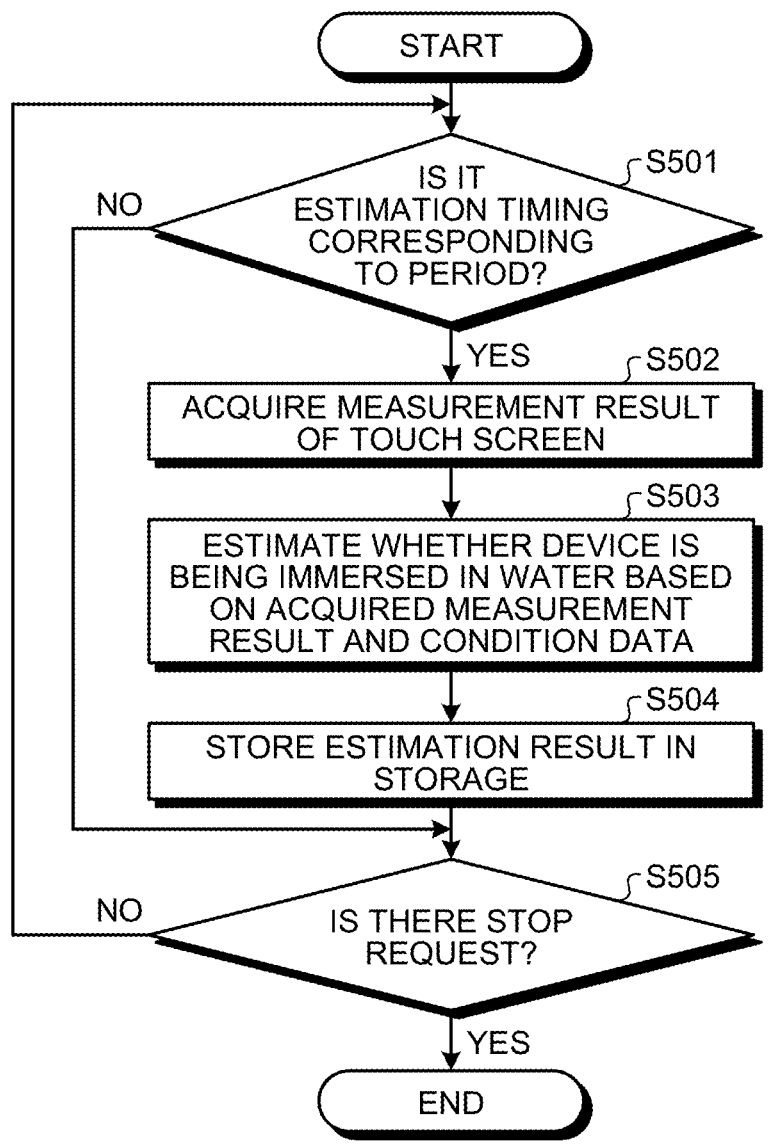
FIG. 13 is a flowchart of an example of the periodic estimation processing.

The following describes an example of the processing procedure of the periodic estimation processing with reference to FIG. 13. FIG. 13 is a flowchart of an example of the periodic estimation processing. The processing procedure illustrated in FIG. 13 is started up by causing the controller 10 to execute the processing at Step S401 illustrated in FIG. 12. The processing procedure illustrated in FIG. 13 is executed by the controller 10.

As illustrated in FIG. 13, the controller 10 of the smartphone 1 determines whether it is estimation timing corresponding to a period at Step S501. Specifically, the controller 10 determines that it is the estimation timing corresponding to the period when a certain time has elapsed after performing the previous estimation using the current time, a timer, and the like. When it is determined that it is not the estimation timing corresponding to the period (No at Step S501), the controller 10 proceeds to Step S505. When it is determined that it is the estimation timing corresponding to the period (Yes at Step S501), the controller 10 proceeds to Step S502.

The controller 10 acquires the measurement result of the touch screen 2B and stores the measurement result in the acceleration data 9Y of the storage 9 at Step S502. Specifically, the controller 10 activates the sensor electrodes of the touch screen 2B and acquires measurement results indicating the output values from the respective sensor electrodes.

The controller 10 estimates whether the device is being immersed in water based on the acquired measurement result and the condition data at Step S503. Specifically, when the electrostatic distribution indicated by the measurement result of the acceleration sensor 15 satisfies the first condition of the condition data, the controller 10 estimates that the device is being immersed in water. When the electrostatic distribution indicated by the measurement result of the acceleration sensor 15 satisfies the second condition of the condition data, the controller 10 estimates that the device is not being immersed in water.

The controller 10 stores the estimation result at Step S503 in the storage 9 at Step S504. The controller 10 determines whether there is a stop request at Step S505. When it is determined that there is no stop request (No at Step S505), the controller 10 returns to Step S501 already described. When it is determined that there is a stop request (Yes at Step S505), the controller 10 ends the processing procedure illustrated in FIG. 13.

In the processing procedure illustrated in FIG. 12, when periodically executing whether the device is being immersed in water, when the state in which the magnitude of acceleration is smaller than the first value continues for the certain time, the controller 10 can stop the periodic execution of estimation. The smartphone 1 has a low possibility of submerging from the air into water or emerging from water into the air when it is in the stationary state, for example. When detecting the stationary state, the smartphone 1 can stop periodically estimating whether it is being immersed in water using the touch screen 2B. Consequently, the smartphone 1 can reduce electric power consumed by the periodic estimation by executing the periodic estimation when it is needed.

While it is estimated that the device is not being immersed in water, when the state in which the magnitude of acceleration is smaller than the first value continues for the certain time, the smartphone 1 can stop the periodic execution of the estimation processing, for example. In other words, the smartphone 1 stops the periodic estimation which uses the touch screen 2B when the possibility of submerging into water is lower than the possibility of a state different from the stationary state, whereby control responsive to the state of the device can be performed.

When the periodic estimation processing is stopped, when detecting acceleration larger than the second value, the controller 10 can resume the estimation processing. The smartphone 1 has the possibility of submerging from the air into water or emerging from water into the air when escaping from the stationary state, for example. When detecting certain acceleration in the stationary state, the smartphone 1 can resume the periodic estimation which uses the touch screen 2B. Consequently, the smartphone 1 can maintain the accuracy of determination as to whether it is in water using the touch screen 2B even with reduced power consumption.

The following describes control about another example of estimation by the smartphone 1 about whether it is being immersed in water with reference to FIG. 14. FIG. 14 is a flowchart of a processing procedure of another example of the control by the smartphone 1. The processing procedure illustrated in FIG. 14 is implemented by causing the controller 10 to execute the control program 9A. The processing procedure illustrated in FIG. 14 is repeatedly executed by the controller 10. The processing procedure illustrated in FIG. 14 may be started to be executed in accordance with the above certain trigger, for example. The following description may attach the same symbols to similar components and omit duplicate descriptions.

In the example illustrated in FIG. 14, pieces of processing at Step S401 to Step S407 are the same as the pieces of processing at Step S401 to Step S407 illustrated in FIG. 12, and only different part will be described with a description of the same part omitted.

As illustrated in FIG. 14, after the controller 10 of the smartphone 1 ends the processing at Step S407, the controller 10 specifies acceleration along the gravity direction at Step S421. The smartphone 1 has a high possibility of moving from the air to water and from water to the air when acceleration acts along the gravity direction in the stationary state than when acceleration acts along another direction, for example. Give this situation, the controller 10 specifies the value of acceleration along the Z-axial direction to be acceleration along the gravity direction based on the direction and the magnitude of acceleration.

The controller 10 determines whether the magnitude of acceleration along the gravity direction is larger than a third value at Step S422. The third value includes an absolute value set for determining that acceleration has acted along the gravity direction in the stationary state of the device, for example. When it is determined that the magnitude of acceleration is larger than the third value (Yes at Step S423), the controller 10 returns to Step S401 already described. Consequently, the controller 10 can execute the estimation processing again which had been stopped.

When it is determined that the magnitude of acceleration is not larger than the third value (No at Step S423), the controller 10 proceeds to Step S410. The controller 10 determines whether estimation is to be ended at Step S410. When it is determined that estimation is not to be ended (No at Step S410), the controller 10 returns to Step S407 already described. When it is determined that estimation is to be ended (Yes at Step S410), the controller 10 ends the processing procedure illustrated in FIG. 14.

In the processing procedure illustrated in FIG. 14, when the periodic estimation processing is stopped, when detecting certain acceleration along the gravity direction, the controller 10 can resume the periodic estimation. The smartphone 1 has the possibility of submerging from the air into water or emerging from water into the air when acceleration acts along the gravity direction in the stationary state, for example. When detecting certain acceleration along the gravity direction in the stationary state, the smartphone 1 can resume the periodic estimation using the touch screen 2B. Consequently, the smartphone 1 can improve the accuracy of determination as to whether it is in water using the touch screen 2B even with reduced power consumption.

Although embodiments describe a case in which the smartphone 1 changes the estimation period when there are both possibilities of the device moving from water to the air and from the air to water, embodiments are not limited thereto. The smartphone 1 may change the estimation period when the device can move from water to the air or from the air to water, for example.

The smartphone 1 can switch the display 2A from a display state to the non-display state when a certain time has elapsed after the last operation by the user, for example. The display state includes a state in which a screen is displayed on the display 2A, for example. The non-display state includes a state in which the light of the display 2A is turned off, for example. The smartphone 1 may change the period of the periodic estimation which uses the touch screen 2B between the display state and the non-display state of the display 2A. The smartphone 1 may shorten the period in the display state to elongate the period in the non-display state than that of the display state, for example.

Although embodiments describe a case in which the smartphone 1 estimates the gravity direction using the acceleration sensor 15, embodiments are not limited thereto. The smartphone 1 may include a second sensor that determines the gravity direction. Examples of the second sensor include, but are not limited to, a gravity sensor and a speed sensor. The second sensor can measure gravity acting in the X-axial direction, the Y-axial direction, and the Z-axial direction. The smartphone 1 may determine the gravity direction based on a measurement result of the second sensor. The smartphone 1 may determine the presence or absence of the movement of the device based on output of an angular velocity sensor in place of the acceleration sensor 15.

Although embodiments describe the smartphone 1 as an example of the mobile device including the touch screen 2B, the mobile device according to the accompanying claims is not limited to a smartphone. The mobile device according to the accompanying claims may be any mobile electronic device other than a smartphone. Examples of the mobile electronic device include, but are not limited to, mobile phones, tablets, portable personal computers, digital cameras, smart watches, media players, electronic book readers, navigators, and game machines.

Characteristic embodiments have been described in order to disclose the techniques according to the accompanying claims perfectly and clearly. However, the accompanying claims should not be limited to embodiments and should be configured to embody all modifications and alternative configurations that those skilled in the art can create within the scope of the basic matters disclosed in the present specification.

Although the invention have been described for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile device comprising:
   an acceleration sensor configured to be capable of detecting a direction and a magnitude of acceleration acting on the mobile device;
   a touch screen configured to be capable of measuring electrostatic distribution; and
   a controller configured to be capable of executing an estimation whether the mobile device is being immersed in water based on the electrostatic distribution, wherein
   the controller periodically executes the estimation upon determining that the mobile device is moving in a direction opposite to a gravity direction based on the direction and the magnitude of the acceleration when estimating that the mobile device is being immersed in water.

2. The mobile device according to claim 1, wherein the controller periodically executes the estimation upon determining that the mobile device is moving in the gravity direction based on the direction and the magnitude of the acceleration when estimating that the mobile device is not being immersed in water.

3. The mobile device according to claim 2, wherein the controller stops the periodic execution of the estimation upon determining that the mobile device is moving in the opposite direction based on the direction and the magnitude of the acceleration while periodically executing the estimation when estimating that the mobile device is not being immersed in water.

4. The mobile device according to claim 1, wherein the controller stops the periodic execution of the estimation upon determining that the mobile device is moving in the gravity direction based on the direction and the magnitude of the acceleration while periodically executing the estimation when estimating that the mobile device is being immersed in water.

5. The mobile device according to claim 1, wherein the controller
   estimates a speed of the mobile device based on the direction and the magnitude of the acceleration, and
   changes the period based on the speed.

6. The mobile device according to claim 1, wherein the controller determines the gravity direction based on the detected magnitude of the acceleration.

7. The mobile device according to claim 1, further comprising a second sensor configured to determine the gravity direction.

8. The mobile device according to claim 1, wherein
   the controller stops the periodic execution of the estimation when a state in which the magnitude of the acceleration is smaller than a certain value continues for a certain time.

9. The mobile device according to claim 8, wherein the controller periodically executes the estimation when the detected magnitude of the acceleration is larger than the certain value while the periodic execution of the estimation is stopped.

10. The mobile device according to claim 8, wherein the controller determines the gravity direction based on the detected magnitude of the acceleration.

11. The mobile device according to claim 8, further comprising a second sensor configured to determine the gravity direction.

12. A mobile device comprising:
    an acceleration sensor configured to be capable of detecting a direction and a magnitude of acceleration acting on the mobile device;
    a touch screen configured to be capable of measuring electrostatic distribution; and
    a controller configured to be capable of execute an estimation whether the mobile device is being immersed in water based on the electrostatic distribution, wherein
    the controller periodically executes the estimation upon determining that the mobile device is moving in the gravity direction based on the direction and the magnitude of the acceleration when estimating that the mobile device is not being immersed in water.

13. The mobile device according to claim 12, wherein the controller stops the periodic execution of the estimation upon determining that the mobile device is moving in the opposite direction based on the direction and the magnitude of the acceleration while periodically executing the estimation when estimating that the mobile device is not being immersed in water.

14. A mobile device comprising:
    an acceleration sensor configured to be capable of detecting a direction and magnitude of acceleration acting on the mobile device;
    a touch screen configured to be capable of measuring electrostatic distribution; and
    a controller configured to be capable of periodically executing an estimation whether the mobile device is being immersed in water based on the electrostatic distribution, wherein
    the controller shortens a period of the estimation upon determining that the mobile device is moving in a direction opposite to a gravity direction based on the direction and the magnitude of the acceleration when estimating that the mobile device is being immersed in water.

15. The mobile device according to claim 14, wherein the controller shortens the period of the estimation upon determining that the mobile device is moving in the gravity direction based on the direction and the magnitude of the acceleration when estimating that the mobile device is not being immersed in water.

16. The mobile device according to claim 15, wherein the controller stops the periodic execution of the estimation upon determining that the mobile device is moving in the opposite direction based on the direction and the magnitude of the acceleration while periodically executing the estimation when estimating that the mobile device is not being immersed in water.

17. The mobile device according to claim 14, wherein the controller stops the periodic execution of the estimation upon determining that the mobile device is moving in the gravity direction based on the direction and the magnitude of the acceleration while periodically executing the estimation when estimating that the mobile device is being immersed in water.

* * * * *